No. 780,051. PATENTED JAN. 17, 1905.
F. MESINGER.
DETACHABLE TIRE COVER.
APPLICATION FILED SEPT. 9, 1904.
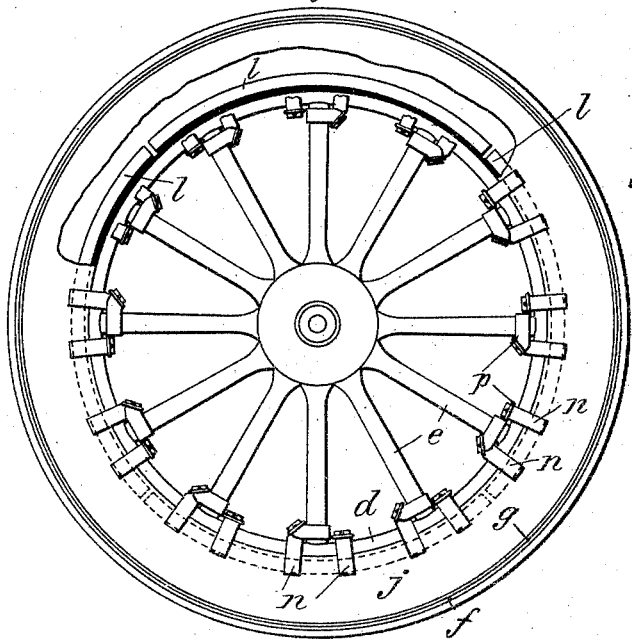
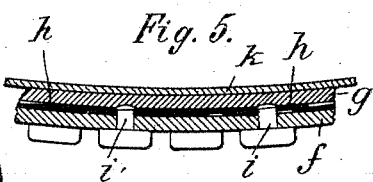
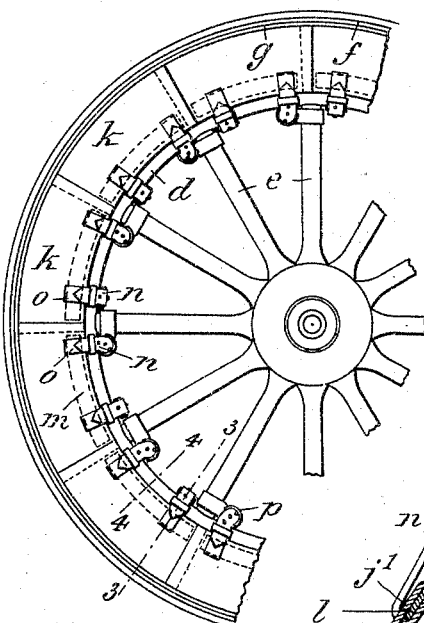
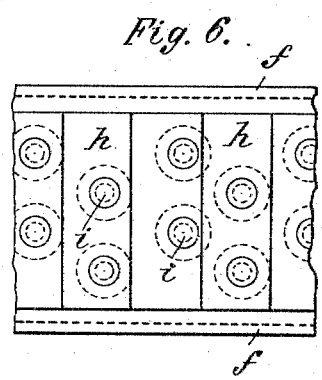
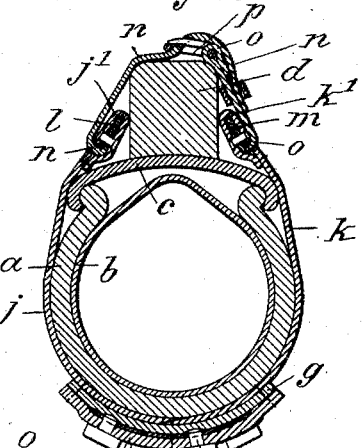
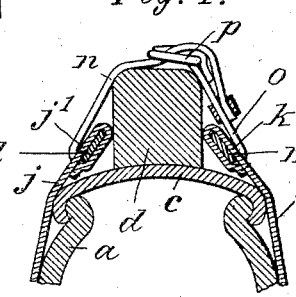
Witnesses:
Arthur Gump
Fred Anfricht
Inventor:
Frederick Mesinger
by Frank V. Briesen Atty.

No. 780,051.　　　　　　　　　　　　　　　　　　　　　　　Patented January 17, 1905.

UNITED STATES PATENT OFFICE.

FREDERICK MESINGER, OF NEW YORK, N. Y.

DETACHABLE TIRE-COVER.

SPECIFICATION forming part of Letters Patent No. 780,051, dated January 17, 1905.

Application filed September 9, 1904. Serial No. 223,909.

*To all whom it may concern:*

Be it known that I, FREDERICK MESINGER, a citizen of the United States, residing at New York city, (Bronx,) county and State of New York, have invented new and useful Improvements in Detachable Tire-Covers, of which the following is a specification.

This invention relates to a detachable tire-cover for motor-cars and other vehicles, which can be readily applied, protects the wheel against injury, and prevents creeping.

In the accompanying drawings, Figure 1 is an outer side view, partly broken away, of a wheel provided with my improved tire-cover with the rivets removed. Fig. 2 is a similar inner side view thereof; Fig. 3, an enlarged cross-section on line 3 3, Fig. 2; Fig. 4, a similar cross-section on line 4 4, Fig. 2; Fig. 5, a longitudinal section through the tire-cover, and Fig. 6 a bottom view thereof with the lining removed.

The letter $a$ represents the tire of a traction-wheel. $b$ is the inflation-tube; $c$, the rim; $d$, the felly, and $e$ the spoke.

The covering is composed of an outer layer or shoe $f$, Fig. 3, an inner layer or lining $g$, and a number of overlapping transversely-arranged curved metal plates $h$, placed between the layers $f$ and $g$, and consequently interposed between the outer surface of the tire and the inner surface of the shoe. Rivets $i$ project with their shanks through the shoe $f$ and are upset in the metal plates $h$. The heads of these rivets form a number of rigid protecting protuberances on the surface of the shoe, Fig. 5.

In order to secure the covering to the tire $a$, it is provided on its outer side with a continuous annular flap $j$, Fig. 1, and on its inner side with a number of short overlapping flaps $k$. The flaps $j$ and $k$ extend to the felly $d$ and are provided along their free ends with seams or pockets $j'$ $k'$, adapted for the reception of flat metal bars $l$ $m$. The pockets $j''$ $k'$ are slotted at their base for the passage of straps $n$ $o$, that are attached to the walls of the pockets and embrace the inner edges of the bars $l$ $m$, respectively. The straps are passed around the felly $d$, alternate straps being also passed around the spokes $e$, Fig. 1, and are connected by buckles $p$. Owing to the construction described, the pockets $j''$ $k'$ will be drawn toward each other and inclined against the felly, Fig. 4, to prevent the formation of dust-receiving crevices between the wheel and the covering.

It will be seen that my covering may be quickly applied and removed, prevents creeping, and thoroughly protects the wheel against puncture.

The drawings show the covering to encompass the entire wheel; but it may also be made in a short length, which may be strapped over a punctured portion of the tire.

What I claim is—

1. A tire-cover composed of a shoe, a series of transverse metal plates, a lining, flaps extending laterally from the shoe, and means for joining the free ends of the flaps, substantially as specified.

2. A tire-cover composed of a shoe, an outer continuous flap, a series of inner overlapping flaps, and means for joining the free end of the outer flap to the free ends of the inner flaps, substantially as specified.

3. A tire-cover composed of a shoe, a series of transverse overlapping metal plates, a lining, rivets projecting through the shoe, outer and inner flaps, and means for joining the free ends of the flaps, substantially as specified.

4. A tire-cover composed of a shoe, flaps extending laterally therefrom, pockets at the ends of the flaps, bars within the pockets, and means for joining the free ends of the flaps, substantially as specified.

5. A tire-cover composed of a shoe, flaps extending laterally therefrom and having pockets which are slotted at their base, flat bars within the pockets, straps engaging the walls of the pockets, and buckles for connecting the straps, substantially as specified.

6. The combination of a tire with a shoe, transverse metal plates interposed between the outer surface of the tire and the inner surface of the shoe, and rivets that project through the shoe and are upset in the metal plates, substantially as specified.

7. The combination of a tire with a shoe, transverse overlapping metal plates interposed between the outer surface of the tire and the inner surface of the shoe, and rivets that project through the shoe and are upset in the overlapping metal plates, substantially as specified.

Signed by me at New York city, (Manhattan,) New York, this 6th day of September, 1904.

FREDERICK MESINGER.

Witnesses:
PETER SCHEIDER,
HENRY MESINGER.